(12) United States Patent
Nguyen et al.

(10) Patent No.: US 11,568,171 B2
(45) Date of Patent: Jan. 31, 2023

(54) SHUFFLING-TYPE GRADIENT METHOD FOR TRAINING MACHINE LEARNING MODELS WITH BIG DATA

(71) Applicant: INTERNATIONAL BUSINESS MACHINES CORPORATION, Armonk, NY (US)

(72) Inventors: Lam Minh Nguyen, Ossining, NY (US); Dzung Tien Phan, Pleasantville, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 198 days.

(21) Appl. No.: 17/109,112

(22) Filed: Dec. 1, 2020

(65) Prior Publication Data
US 2022/0171996 A1   Jun. 2, 2022

(51) Int. Cl.
*G06K 9/62* (2022.01)
*G06N 3/02* (2006.01)
*G06F 17/16* (2006.01)

(52) U.S. Cl.
CPC ............ *G06K 9/6257* (2013.01); *G06F 17/16* (2013.01); *G06K 9/623* (2013.01); *G06N 3/02* (2013.01)

(58) Field of Classification Search
CPC ...... G06K 9/6257; G06K 9/623; G06F 17/16; G06N 3/02
See application file for complete search history.

(56) References Cited

U.S. PATENT DOCUMENTS

| 10,713,589 B1 | 7/2020 | Zarandioon et al. |
| 2017/0300829 A1 | 10/2017 | Iyengar et al. |
| 2019/0095785 A1 | 3/2019 | Sarkar et al. |
| 2020/0089996 A1 | 3/2020 | Zaifman et al. |

(Continued)

FOREIGN PATENT DOCUMENTS

CN   106339351 B   5/2019

OTHER PUBLICATIONS

Heigold et al, "Asynchronous Stochastic Optimization for Sequence Training of Deep Neural Networks", 2014, IEEE International Conference on Acoustic, Speech and Signal Processing (ICASSP), pp. 5587-5591 (5 pages) (Year: 2014).*

(Continued)

*Primary Examiner* — David F Dunphy
(74) *Attorney, Agent, or Firm* — Intelletek Law Group, PLLC; Gabriel Daniel, Esq.

(57) ABSTRACT

A computer-implemented method for a shuffling-type gradient for training a machine learning model using a stochastic gradient descent (SGD) includes the operations of uniformly randomly distributing data samples or coordinate updates of a training data, and calculating the learning rates for a no-shuffling scheme and a shuffling scheme. A combined operation of the no-shuffling scheme and the shuffling scheme of the training data is performed using a stochastic gradient descent (SGD) algorithm. The combined operation is switched to performing only the shuffling scheme from the no-shuffling scheme based on one or more predetermined criterion; and training the machine learning models with the training data based on the combined no-shuffling scheme and shuffling scheme.

25 Claims, 12 Drawing Sheets

(56) References Cited

U.S. PATENT DOCUMENTS

2020/0118549 A1    4/2020  Heigold et al.
2021/0073661 A1*   3/2021  Matlick ................. G06N 20/00

OTHER PUBLICATIONS

Qi Meng et al, "Convergence Analysis of Distributed Stochastic Gradient Descent with Shuffling", 2017, 31st Conference on Neural Information Processing Systems (NIPS), pp. 1-18 (18 pages) (Year: 2017).*
Polyak, B. T. et al., "Acceclaration of Stochastic Approximation by Averaging"; Siam J. Control and Optimization (1992); vol. 30:4; pp. 838-855.
Nguyen, L. M. et al., "SGD and Hogwild! Convergence Without the Bounded Gradients Assumption"; Proceedings of the 35th International Conference on Machine Learning; PMLR (2018) vol. 80, 9 pgs, Stockholm, Sweden.
Safran. I. et al., "How Good is SGD with Random Shuffling?"; arXiv:1908.00045v2 [cs.LG] (2020); 33 pgs.
Nesterov, Y. et al., "Cubic Regularization of Newton Method and its Global Performance"; Mathematics Subjection Classification (1991); 27 pgs.
Nesterov, Y. et al., "Introductory Lectures on Convex Optimization: A Basic Course"; Applied Optimization (2004); Editors Pardalos et al., Kluwer Academic Publishers, Boston, MA. 253 pgs (part 1, 84 pgs).
Nesterov, Y. et al., "Introductory Lectures on Convex Optimization: A Basic Course"; Applied Optimization (2004); Editors Pardalos et al., Kluwer Academic Publishers, Boston, MA. 253 pgs (part 2, 84 pgs).
Nesterov, Y. et al., "Introductory Lectures on Convex Optimization: A Basic Course"; Applied Optimization (2004); Editors Pardalos et al., Kluwer Academic Publishers, Boston, MA. 253 pgs (part 3, 85 pgs).
"Optimization for Machine Learning", edited by Suvrit Sra, The MIT Press (2012), Cambridge, MA, 509 pgs (part 1, 127 pgs).
"Optimization for Machine Learning", edited by Suvrit Sra, The MIT Press (2012), Cambridge, MA, 509 pgs (part 2 127 pgs).
"Optimization for Machine Learning", edited by Suvrit Sra, The MIT Press (2012), Cambridge, MA, 509 pgs (part 3, 127 pgs).
"Optimization for Machine Learning", edited by Suvrit Sra, The MIT Press (2012), Cambridge, MA, 509 pgs (part 4, 128 pgs).
Nagaraj; D. et al., "SGD without Replacement Sharper Rates for General Smooth Convex Functions"; Proceedings of the 36 th International Conference on Machine Learning; PMLR (2019); vol. 97, 5 pgs., Long Beach, California.
Ying, B. et al., "Convergenc of Variance-Reduced Stochastic Learning under Random Reshuffling" arXiv:1708.01383v2 [csLG] (2017); 22 pgs.
Johnson, R. et al., "Accelerating Stochastic Gradient Descent using Predictive Variance Reduction"; NIPS (2013); 9 pgs.
Shamir, O., "Without-Replacement Sampling for Stochastic Gradient Methods"; NIPS (2016); 9 pgs.
Pham, H. N. et al., "ProxSARAH: An Efficient Algorithmic Framework for Stochastic Composite Nonconvex Opitimization" I J. Mach. Learning Res. (2020); 48 pgs.
Mell, P. et al., "Recommendations of the National Institute of Standards and Technology"; NIST Special Publication 800-145 (2011); 7 pgs.
Anonymous, "Shuffling-Type Gradient Methods for the Finite Sum Problems"; 34th Conference on Neural Information Processing Systems (NeurIPS—2020); 27 pgs.
Bertsekas, D. P., "Incremental Gradient, Subgradient, and Proximal Methods for Convex Optimization: A Survey" arXiv:1507.01030v2 [cs.SY]; (2017); 45 pgs.
Bottou, L., "Stochastic Gradient Descent Tricks"; Microsoft Research (2012); 14 pgs.
Bottou, L. et al., "Optimization Methods for Large-Scale Machine Learning"; arXiv:1606.04838v3 [stat ML] (2018) 95 pgs.
Bottou, L., "Curiously Fast Convergence of Some Stochastic Gradient Descent Algorithms"; (2009); 4 pgs.
Chang, C. et al., "LIBSVM: A Library for Support Vector Machines"; National Taiwan University (2001); Taipei, Taiwan; 39 pgs.
Cutkosky, A. et al., "Momentum-Based Variance Reduction in Non-Convex SGD"; 33rd Conference on Neural Information Processing Systems (NeurIPS—2019), Vancouver, Canada; 10 pgs.
Defazio, A. et al., "SAGA: A Fast Incremental Gradient Method with Support for Non-Strongly Convex Composite Objectives"; arXiv:1407.0202v3 [cs.LG] (2014); 15 pgs.
Defazio, A. et al., "Finito: A Faster, Permutable Incremental Gradient Method for Big Data Problems" arXiv:1407.2710v1 [cs LG] (2014); 9 pgs.
Duchi, J. et al., "Adaptive Subgradient Methods for Online Learning and Stochastic Optimization"; (Date: Unknown); 13 pgs.
Abadi, M. et al., "TensorFlow: Large-Scale Machine Learning on Heterogeneous Distributed Systems" arXiv:1603.044672 [cs.DC] (2016); 19 pgs.
Ghadimi, S. et al., "Stochastic First- And Zeroth-Order Methods for Nonconvex Stochastic Programming" arXiv:1309.5549v1 [math.OC] (2013); 25 pgs.
Gurbuzbalaban, M. et al., "Convergence Rate of Incremental Gradient and Incremental Newton Methods" arXiv.1510.08562v2 [math.OC]; (2019); 24 pgs.
Gurbuzbalaban, M. et al., "Why Random Reshuffling Beats Stochastic Gradient Descent"; arXiv:1510.08560v3 [math.OC] (2019); 26 pgs.
Haochen, J. Z. et al., "Random Shuffling Beats SGD after Finite Epochs"; arXiv:1806.10077v2 [math.OC] (2019); 36 pgs.
Karimi, H. et al., "Linear Convergence of Gradient and Proximal-Gradient Methods Under the Polyak- Lojasiewicz Condition"; arXiv:1608.04636v4 [cs.LG] (2020); 25 pgs.
Kasai, H. "SGDLibrary: A MATLAB Library for Stochastic Gradient Descent Algorithms"; arXiv:1710.10951v2 [cs.MS] ( 2018); 27 pgs.
Kingma, D. P. et al., "Adam: A Method For Stochastic Optimization"; arXiv:1412.6980v9 [cs.LG] (2017); 15 pgs.
Krizhevsky, A. et al., "Chapter 1, Preliminaries", in Learning Multiple Layers of Features from Tiny Images; (2009) 60 pgs.
Le Roux, N. et al., "A Stochastic Gradient Method with an Exponential Convergence Rate for Strongly-Convex Optimization with Finite Training Sets"; HAL (2012); 33 pgs.
Le Cun, Y. et al., "Gradient-Based Learning Applied to Document Recognition"; Proc of the IEEE (1998); 46 pgs.
Li, X. et al., "Incremental Methods for Weakly Convex Optimization"; arXiv:1907.11687v1 [math.OC] (2019); 25gs.
Meng, Q. et al., "Convergence Analysis of Distributed Stochastic Gradient Descent with Shuffling" arXiv:1709.10432v1 [stat.ML] (2017); 18 pgs.
Nedic, A. et al., "Convergence Rate of Incremental Subgradient Algorithms"; Stochastic Optimization: Algorithms and Applications (2000); 42 pgs.
Nedic, A. et al., "Incremental Subgradient Methods for Nondifferentiable Optimization"; SIAM J. OPTIM (2001); vol. 12:1; pp. 109-138.
Nemirovski, A. et al., "Robust Stochastic Approximation Approach to Stochastic Programming"; SIAM J. OPTIM (2009); vol. 19:4; pp. 1574-1609.
Nguyen, L. M. et al., "Sarah: A Novel Method for Machine Learning Problems Using Stochastic Recursive Gradient"; arXiv:1703.00102v2 [stat.ML] (2017); 14 pgs.
Polyak, B. T., "Some Methods of Speeding up the Convergence of Iteration Methods"; Research Gate USSR ; Computational Mathematics and Mathematical Physics (1964); vol. 4:5; pp. 1-17.
Reddi, S. J. et al., "Stochastic Variance Reduction for Nonconvex Optimization"; Proceedings of the 33rd International Conference on Machine Learning (2016); 10 pgs.
Robbins, H. et al., "A Stochastic Approximation Method"; The Annals of Mathematical Statistics (1951); vol. 22:3; pp. 400-407.

(56) References Cited

OTHER PUBLICATIONS

Tran-Dinh, Q. et al., "A Hybrid Stochastic Optimization Framework for Composite Nonconvex Optimization"; arXiv:1907.03793v2 [math.OC] (2020); 49 pgs.

* cited by examiner

- In many supervised learning tasks, we are given the training data /* 205 which represents an underlying distribution. The goal is to learning a predictive model $h_w(x)$ from the data. Examples for $h_w(x)$ include
  - Linear regression  $h(x) = w^T x$
  - Logistic regression  $h(x) = 1/1 + exp(-w^T x)$

- To learn the model parameter $w$, *empirical risk minimization* is the most widely-used optimization framework /* 225

$$w = \arg\min \frac{1}{n} \sum_{i=1}^{n} \ell(h(x_i; w), y_i)$$

$w$: model parameters
$\ell$: loss function
$h(x_i; w)$: predictive model
$n$: number of training data
$x_i, i = 1, \ldots, n$: training input
$y_i, i = 1, \ldots, n$: training label

FIG. 2

- Faster convergence for machine learning models with a small training loss, e.g. > 95% accuracy
- Make use of all samples uniformly

| Datasets | Architecture | Train accuracy |
|---|---|---|
| MNIST | FFN | 1.0000 |
| SVHN | FFN | 0.9997 |
| MNIST | CNN | 1.0000 |
| SVHN | CNN | 0.9999 |
| CIFAR10 | CNN | 1.0000 |
| CIFAR100 | CNN | 0.9988 |

FIG. 7

SHUFFLING-TYPE GRADIENT METHOD FOR TRAINING MACHINE LEARNING MODELS WITH BIG DATA

BACKGROUND

Technical Field

The present disclosure generally relates to techniques for applying stochastic gradient methods in machine learning, and more particularly, to techniques using stochastic gradient methods to train machine learning models with big data.

Description of the Related Art

There are stochastic gradient methods in use today that have various levels of success to solve problems associated with training convex models and non-convex models in machine learning. A gradient descent method measures a degree of change of a variable in response to the changes of another variable. A descent direction is a gradient of a function component of the loss function having an output that is a partial derivative of a set of input parameters.

A stochastic gradient descent method (SGD) is one of several gradient methods used in machine learning. SGD attempts to find a global minimum through adjustment of a network configuration after each training point. Rather than finding the full gradient, in SGD an error is decreased by approximating the gradient for a randomly selected training sample. The randomly selected training sample results from randomly shuffling the dataset and working in a methodical fashion through the samples. The SGD method is a popular method for training machine learning models, and SGD often converges faster than batch training (e.g., using full gradients) because it performs updates more frequently. In addition, SGD can efficiently exploit advanced computing architectures such as GPUs, and distributed computing due to gradient estimates can be done in parallel. Due to the randomness of using SGD, this method is popular because SGD can escape from a local minimum, and can often find the global solution (e.g., training non-convex DNN models).

When performing SGD to train machine learning models, the training data is often shuffled to compute the gradients no longer independently sampled from the training data set. The data may also be partitioned across a plurality of machines depending on the size, and a number of epochs may be performed on the re-shuffled data.

In machine learning involving Big Data, if the number of data is large and the full data cannot be stored by one device, the training process can be very time-consuming. Thus, there is room to improve a learning rate scheme for the SGD method to speed up training machine learning models.

SUMMARY

According to one embodiment, a computer-implemented method for a shuffling-type gradient for training of machine learning models with big data using a stochastic gradient descent (SGD) includes uniformly randomly distributing data samples or coordinate updates of a training data. A combined no-shuffling scheme and shuffling scheme of the training data is performed using a stochastic gradient descent (SGD) algorithm. There is a switching from performing the combined no-shuffling scheme and shuffling scheme to performing only the shuffling scheme based on one or more predetermined criterion. The machine learning models are trained with the training data based on performing the pure shuffling scheme and the combined no-shuffling scheme and shuffling scheme. This hybrid randomized shuffling gradient scheme results in a convergence rate that in a non-convex case is new and significantly improved over existing works under standard assumptions, and the convergence rate on the strongly-convex cases matches the best-known cases up to a constant factor without imposing a bounded gradient condition, and for solving finite sum minimization problems.

In one embodiment, the data samples or coordinate updates of the training data are big data. Big data is a particular challenge and the hybrid randomized shuffling scheme results in a more efficient way of training such large amounts of data.

In one embodiment, the SGD algorithm used for performing the combined no-shuffling scheme and shuffling scheme includes at least one of Adagrad, Adam, RMSProp, or SGD Momentum algorithms. Each of these algorithms is particularly suited for use with the present hybrid randomized shuffling scheme.

In one embodiment, the one or more predetermined criteria include a learning rate, and the switching from the no-shuffling scheme to the pure shuffling occurs based on the value of the learning rate of the machine learning algorithm progress. This switching provides a more efficient way to increase the convergence rate, without getting stuck at local minima.

In one embodiment, the one or more predetermined criterion include a machine learning error rate, and the switching to the pure shuffling scheme occurs according to the machine learning error rate. A more efficient process with fewer errors is the result.

In one embodiment, the one or more predetermined criterion include learning rate rules for the no-shuffling scheme and the shuffling scheme, and the method further includes providing one or more learning rate rules that determine one or more of a predetermined theoretical complexity or a practical performance of the SGD algorithm. The learning rules provide a practical performance of the SGD algorithm can be used to result in an improved convergence rate.

In one embodiment, the learning rate rules include a diminishing learning rate scheme and obtaining a highest convergence rate result in a non-convex supervised learning model. By virtue of this feature, an increased convergence rate is achieved.

In one embodiment, the machine learning models are trained for a deep neural network (DNN) application. Deep Neural Networks typically require a complex training, and this training is facilitated by having the machine learning models set up for training the DNN.

In one embodiment, the machine learning models are trained for one or more of linear regression and binary classification operations. Improved operation of linear regression and binary operations are facilitated.

In one embodiment, a computing device including a configurable machine learning framework for training of machine learning models with a shuffling-type gradient operation of big data includes, a processor, a memory coupled to the processor, the memory storing instructions to cause the processor to perform acts including generating a machine learning framework including a combined no-shuffling scheme and a shuffling scheme using stochastic gradient descent (SGD) algorithm. The machine learning framework is further configured for receiving predetermined criterion for switching to performing only the shuffling scheme from the combined operation of the no-shuffling scheme and the shuffling scheme, and training the machine learning models based on the combined operation of the no-shuffling scheme and the shuffling scheme, and on performing only the shuffling scheme. This hybrid randomized shuffling gradient scheme results in a convergence rate that in a non-convex case is new and significantly improved over existing works under standard assumptions, and the convergence rate on the strongly-convex cases matches the best-known cases up to a constant factor without imposing a bounded gradient condition, and for solving finite sum minimization problems.

In one embodiment, the computing device is configured for receiving a user-selection of the predetermined criterion for switching to performing only the shuffling scheme from the no-shuffling scheme. The switch provides for a more efficient way to obtain a convergence rate.

In one embodiment, the machine learning framework is configured to perform the combined shuffling and no-shuffling scheme from one or more SGD algorithms including Adagrad, Adam, RMSProp, or an SGD Momentum. Each of these algorithms is particularly suited for use with the present hybrid randomized shuffling scheme.

In one embodiment, the predetermined criterion for switching to performing only the shuffling scheme from the no-shuffling scheme includes an error rate.

In one embodiment, the predetermined criterion for switching to performing only the shuffling scheme from the no-shuffling scheme includes a learning rate.

In one embodiment, the machine learning framework is configured to prompt for at least one of an error rate or a learning rate as the predetermined criterion for switching to performing only the shuffling scheme from the no-shuffling scheme.

In one embodiment, a computing device is configured for performing a shuffling-type gradient for training of machine learning models with big data using a stochastic gradient descent (SGD). The computer-implemented method includes: a processor and a memory coupled to the processor. The memory stores instructions to cause the processor to perform acts including uniformly randomly distributing data samples or coordinate updates, performing a combined no-shuffling scheme and shuffling scheme of the data samples or coordinate updates. There is a switching to perform only the shuffling scheme from the no-shuffling scheme based on one or more predetermined criterion. The training of the machine learning models with the data samples or coordinate updates is more efficient with the switching operation.

In one embodiment, the instructions cause the processor to perform additional acts including: switching to operation of only the shuffling scheme according to a learning rate of the machine learning. By virtue of this feature a more efficient operation is provided.

In one embodiment, the instructions cause the processor to perform additional acts including switching to operation of only the shuffling scheme according to a threshold for the learning rate of the machine learning algorithm. The learning rate of the machine learning is a way to indicate that the operation is proceeding as planned, or that additional interventions may be performed.

In one embodiment, a computer-implemented method of determining a shuffling-type gradient method for training machine learning models with big data uses a stochastic gradient descent (SGD) method. The method includes: uniformly randomly distributing data samples or coordinate updates of a training data. There is a combining of a no-shuffling scheme and a shuffling scheme into a framework, and a learning rate scheme is diminished to obtain highest known convergence rate result for randomly distributed samples in a non-convex logistic regression.

In one embodiment, the machine learning models are trained for a deep neural network (DNN) application. Deep Neural Networks typically require a complex training, and this training is facilitated by having the machine learning models set up for training the DNN.

In one embodiment, the machine learning models are trained for linear regression and binary classification operations. Improved operation of linear regression and binary operations are facilitated by training the machine learning models in such operations.

In one embodiment, a non-transitory computer-readable storage medium tangibly embodying a computer-readable program code having computer-readable instructions that, when executed, causes a computer device to perform a shuffling-type gradient method for training of machine learning models with big data using a stochastic gradient descent (SGD). The shuffling-type gradient method includes uniformly randomly distributing data samples or coordinate updates. A combined no-shuffling scheme and shuffling scheme of the samples or coordinate updates are performed, and there is a switch to performing only the shuffling scheme from the no-shuffling scheme is based on a predetermined criterion. The learning models are trained with the data samples or coordinate updates based on performing only the shuffling scheme and the combined no-shuffling scheme and shuffling scheme. This hybrid randomized shuffling gradient scheme results in a convergence rate that in a non-convex case is new and significantly improved over existing works under standard assumptions, and the convergence rate on the strongly-convex cases matches the best-known cases up to a constant factor without imposing a bounded gradient condition, and can solve finite sum minimization problems.

In one embodiment, the one or more predetermined criterion include learning rate rules. The shuffling-type gradient method further includes providing one or more learning rate rules that determine one or more of a predetermined theoretical complexity and a practical performance of the SGD algorithm. The learning rules provide operation of the SGD algorithm to be used with an improved convergence rate.

In one embodiment, providing the learning rate rules include: a diminishing learning rate scheme and obtaining a highest convergence rate result in a non-convex supervised learning model. The highest convergence rate is an advantage of utilizing the learning rate rules.

In one embodiment, the machine learning models are trained for one or more of linear regression and binary classification operations. This machine learning model training provides an advantage, particularly in the non-convex problem solving.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead of those shown. Details that may be apparent or unnecessary may be omitted to save space or for more effective illustration. Some embodiments may be practiced with additional components or steps and/or without all the components or steps that are illustrated.

When the same numeral appears in different drawings, it refers to the same or like components or steps.

FIG. 2 illustrates a supervised learning scenario from which a predictive model is to be learned.

FIG. 7 illustrates some of the advantages of the computer-implemented method, consistent with an illustrative embodiment.

DETAILED DESCRIPTION

Overview

Figure 1:
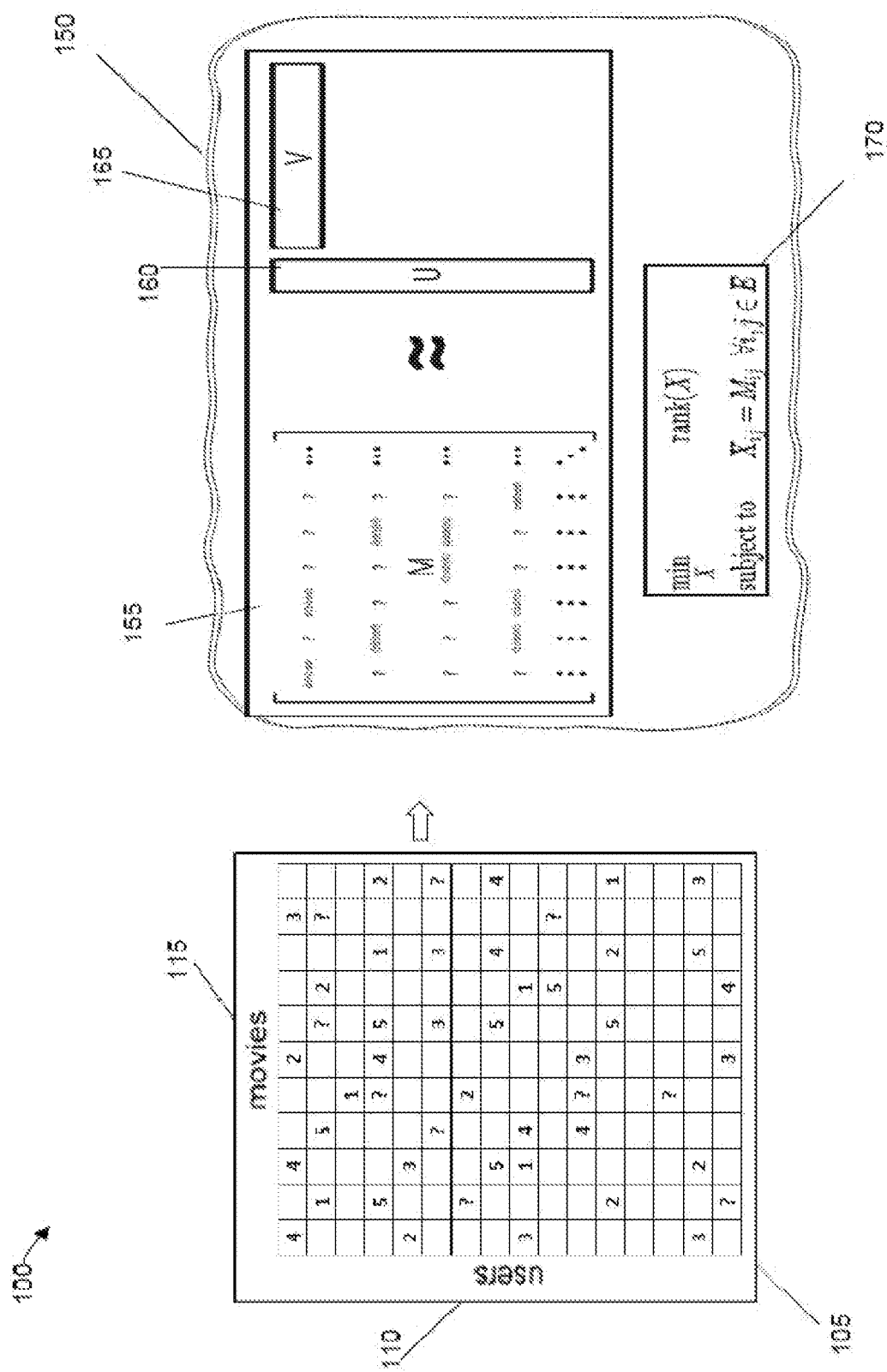
FIG. 1 is an illustration of a matrix completion problem of a movie recommender system.

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high-level, without detail, to avoid unnecessarily obscuring aspects of the present teachings.

As used herein, a function is considered to be convex if a line segment of any two points on a graph of the function is positioned above a graph between the two points. If there are a set of points on or above the graph of the function, such points may form a convex set.

A strongly convex function is a convex function having a unique optimal solution while a convex function could have multiple optimal solutions or no optimal solution (e.g., a linear function).

A function is considered strongly convex if there exists a quadratic lower bound on the growth of the function, with a parameter m>0. That is, f(x) is strongly-convex if there exists a parameter m>0, the following inequality holds for all points x, y: $f(y) >= f(x) + <\f(x), x-y> + (m/2)*\|y-x\|^2$.

As used herein, the term "non-convex problem" generally refers to an optimization problem having a plurality of local optimal points. The term "convex problem" generally refers to an optimization problem where the objective function is a convex function. The feasible set is a convex set, and when function mapping some subset is performed, the subset is convex if its domain is convex. f(x) is convex if the following inequality holds for all points x, y: $f(y)>=f(x)+<\f(x), x-y>$.

The proposed architecture is a hybrid randomized shuffling gradient scheme. The architecture disclosed herein covers many variants such as randomized reshuffling, single permutation, and cyclic and incremental gradient schemes. In particular, there are at least two different settings under consideration: strongly-convex problems and non-convex problems. One of the improvements of the present disclosure includes the use of new non-asymptotic and asymptotic convergence rates for a general class of shuffling-type gradient methods in both non-convex problems and strongly-convex problems by introducing a novel learning rate scheme. In the case of strongly-convex problems, the proposed algorithm is particularly useful for linear regression, and binary classification.

In the case of a non-convex problem, the convergence rate of a computer-implemented method and system according to the present disclosure is significantly improved over existing works under standard assumptions. Thus, the computer-implemented method and system of the present disclosure provide an improvement in the field of performing finite miniaturization and approximation problems. For non-convex problems the proposed algorithm is particularly helpful for use in training deep neural networks. In addition, the computer-implemented method and system of the present disclosure provides an improvement in computer operations, as the operations are faster and more accurate (particularly for the non-convex problems) than previously known, which provides a technical improvement of freeing up computer resources and using less computing power to solve such non-convex problems.

In the case of a strongly-convex problem, the convergence rate matches the best-known rates up to a constant factor without imposing a bounded gradient condition. The effect of learning rates via non-convex logistic regression and neural network training examples are also discussed herein. The results suggest some appropriate choices of learning rates. In one example, the best learning rate is $$n_t = \frac{\gamma}{t^{1/3}}$$

with $n_t$ being the number of steps.

Big Data can pose a challenge for operating methods such as SGD because the number of sample points is often very large. SGD needs a large number of gradient calculations, which is proportional to the number of sample points. FIG. 1 shows a matrix 105 for movie recommender systems. The numbers in the boxes are user ratings of particular movies ranging on a scale of 1 to 5. The matrix shows movies 115 versus users 110. The number of users 110 is very large, (e.g., in the millions), and the number of movies 115 is in the thousands. The group 150 shows the breakdown of matrix M 155, and U 160 and V 160, and their loss functions. Given few entries on the observed matrix 150, the goal is to complete the matrix by approximating the unobserved entries. There is also a ranking operation 170 shown.

With reference to FIG. 1, the loss function for learning U and V is:

$$\min_{U,V} \sum_i \sum_j K_{ij}(U_i V_j^T - M_{ij})^2 + \lambda_U \sum_i \|u_i\|^2 +$$

$$\lambda_V \sum_i \|v_j\|^2 \Rightarrow \min_{U,V} L(U, V) = \sum_{(i,j) \in E} \epsilon(M_{ij}, U_{ij}, V_{ij})$$

wherein the matrix M is the input matrix which has some missing entries, the unknown matrices are used to approximate the input matrix M, $K_{ij}$, $\lambda_U$, $\lambda_V$ are model parameters.

In addition, there are finite sum minimization problems that cover wide ranges of convex and non-convex models in machine learning, statistical learning including multi-kernel learning, logistic regression, conditional random fields, and neural networks. More particularly, finite sum minimization problems include performing empirical risk minimization. Empirical risk minimization (EMR) is used to gauge the performance of an algorithm in practice (which entails risk) because an actual data distribution is unknown.

Example Architecture

FIG. 2 illustrates a supervised learning scenario from which a predictive model is to be learned. Referring to FIG. 2, it is shown at 205 that training data is usually given for a supervised learning task. In this example, the data is represented by $\mathcal{D}_n = \{(x_1, y_1), \ldots, (x_n, y_n)\}$, with x and y being data values. The goal is to learn a predictive model $h_w(x)$ from the data. Examples of linear regression and logistic regression are shown. Linear regression describes a relationship between one or more independent variables (x) and a dependent variable (y). Also shown in an expression for logistic regression is a technique in statistical analysis that is used to predict a data value based on previous observations.

Still referring to FIG. 2, the linear regression and logistic regression utilize a model parameter w, and as shown at 225, empirical risk minimization is a widely used optimization framework. The performance of an algorithm on a known set of training data is a widely-used optimization framework to solve for a model parameter w:

$$w = \operatorname{argmin} \frac{1}{n} \sum_{i=1}^{n} \ell(h(x_i; w), y_i) \quad \text{(Eqn. 1)}$$

wherein: w: model parameters
l: loss function
$h(x_i; w)$: predictive model
n: number of training data
$x_i$, i=1, ..., n: training input
$y_i$, i=1, ..., n: training label.

Figure 3:
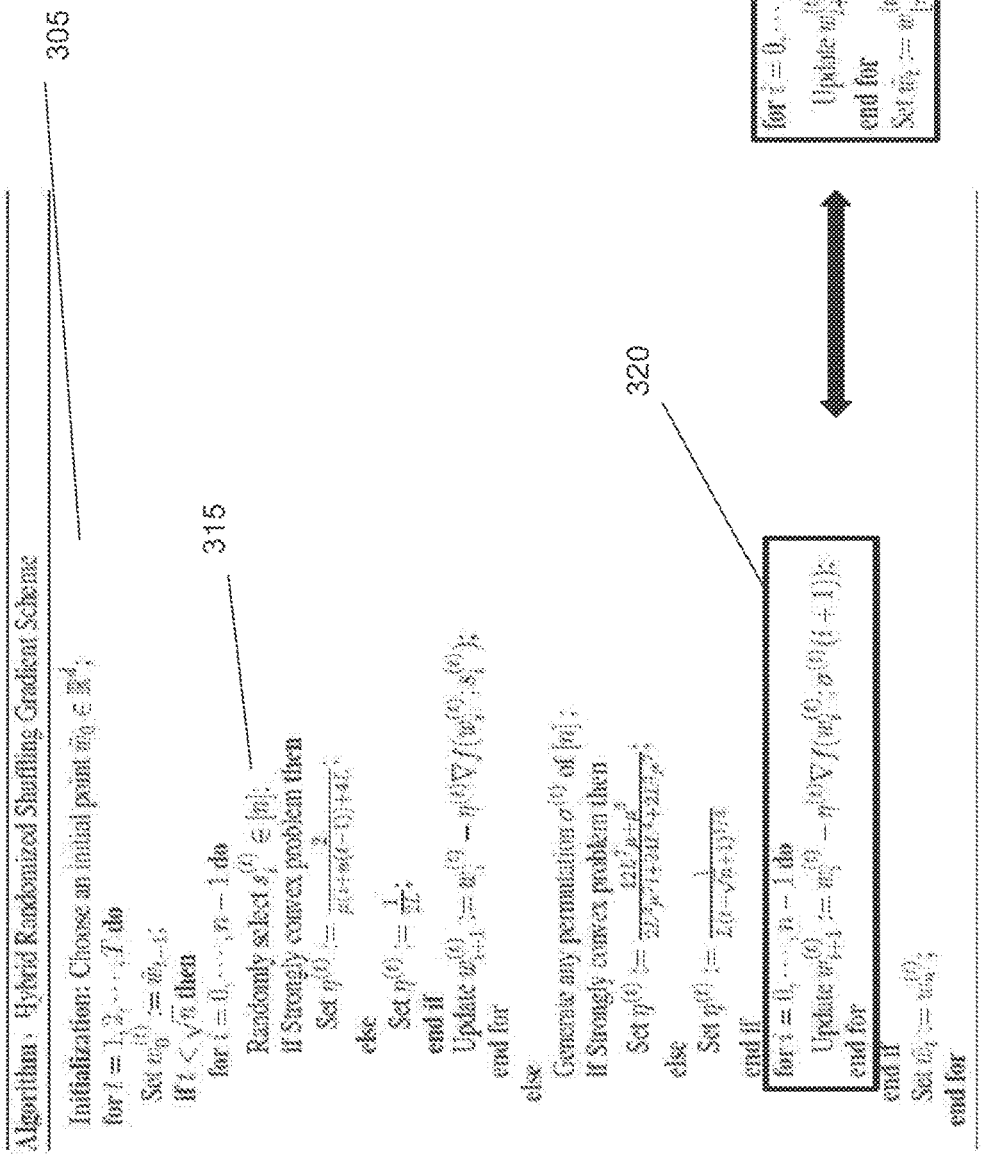
FIG. 3 provides an architectural overview of an algorithm for a hybrid randomized shuffling gradient scheme, consistent with an illustrative embodiment.

FIG. 3 provides an architectural overview of an algorithm for a hybrid randomized shuffling gradient scheme, consistent with an illustrative embodiment. At 305, it is shown that an initial point $\tilde{w}0 \in \mathbb{R}^d$; is selected, followed by a random selection 315 (s ∈ [n]). can change from the single batch (box 320) by using the mini-batch (box 325). The mini-batch can be used when there are more computing resources to distribute.

There is also a determination as to whether the problem is strongly-convex or not, as the application of different formulas are applied as shown. With regard to determining when to switch between the shuffling and the no-shuffling, the of the schemes is based on the relationship between the number of iterations and the number of samples t<\sqrt{n}. If t<\sqrt{n}, we use no-shuffling scheme; and if t>=\sqrt{n}, we use shuffling scheme.

Figure 4:
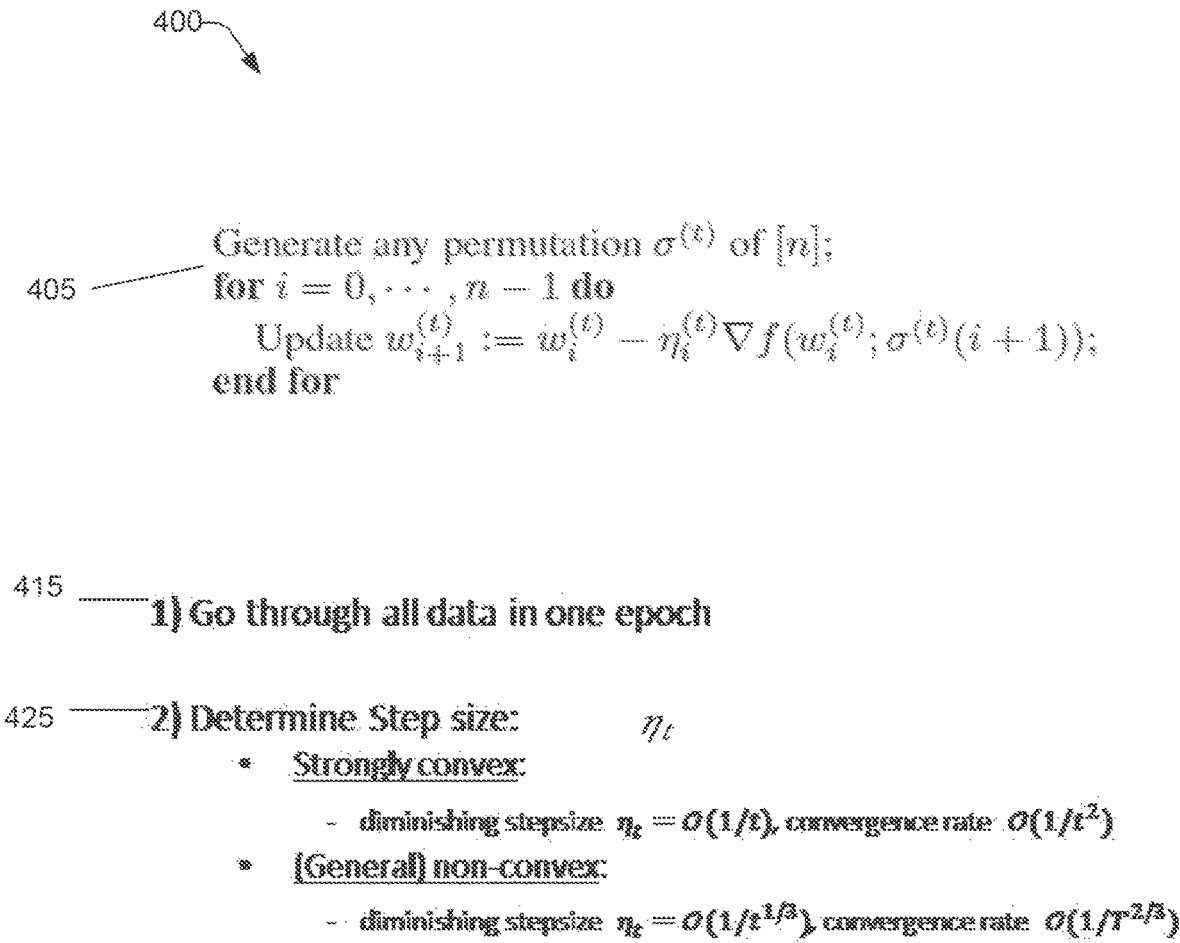
FIG. 4 is a summary of the functions of the algorithm for a hybrid randomized shuffling gradient scheme, consistent with an illustrative embodiment.

FIG. 4 is a summary of the functions of the algorithm for a hybrid randomized shuffling gradient scheme, consistent with an illustrative embodiment. Referring to FIG. 4, whereas in conventional operations:
    for i=0, ..., n−1 do
        Sample $s_i^{(t)}$ uniformly at random from [n];
        Update $w_{i+1}^{(t)} := w_i^{(t)} - n_i^{(t)} \nabla f(w_i^{(t)}; s_i^{(t)})$;
    end for However, rather than a uniformly random sample, according to the present disclosure, it is shown at 405:
    Generate any permutation $\sigma^{(t)}$ of [n];
    for i=0, ..., n−1 do
        Update $w_{i+1}^{(t)} := w_i^{(t)} - \eta_i^{(t)} \nabla f(w_i^{(t)}; \sigma^{(t)}(i+1))$;
    end for The generation of any permutation as shown above, there is virtually no chance for missing data, since at each epoch, the sample from $\sigma^{(t)}$ by the order $\sigma^{(t)}(1), \ldots, \sigma^{(t)}(n)$ is used.

At 410 it is shown to go through all the data in one epoch, and at 415 to determine the step size based on whether there is strongly-convex or non-convex problem.

Figure 5:
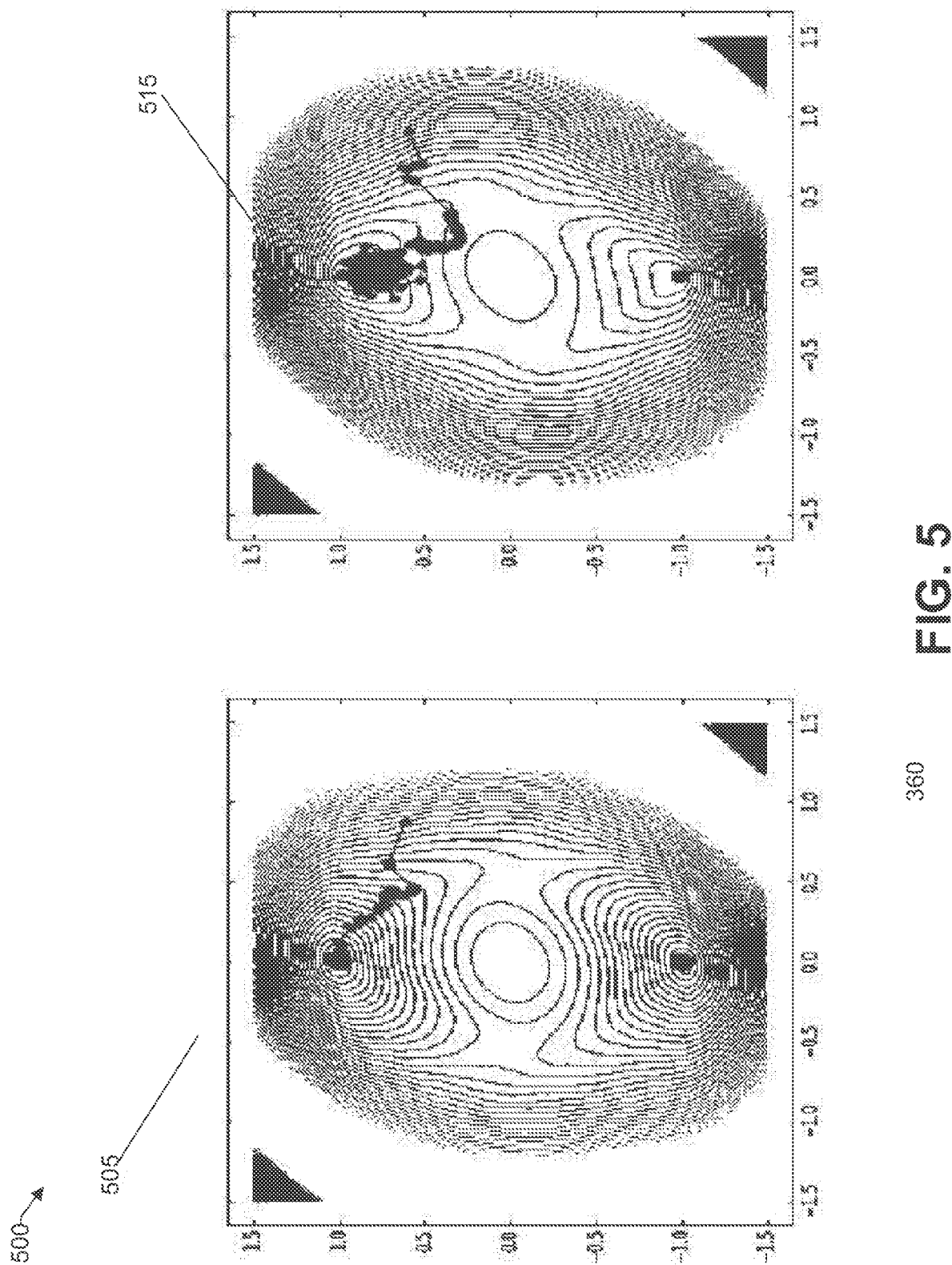
FIG. 5 illustrates machine learning models with different training loss variations, consistent with an illustrative embodiment.

FIG. 5 illustrates machine learning models 500 with different training loss variations, consistent with an illustrative embodiment. It can be seen in FIG. 5 that at 505 there is a machine learning graphical representation with a small training loss and a small variance at solutions. At 515 there is a large training loss and a large variance than in the representation 505. FIG. 5 shows the contour of the objective function and is an example in 2D dimensional space with coordinates x and y corresponding to x and y axes.

Figure 6:
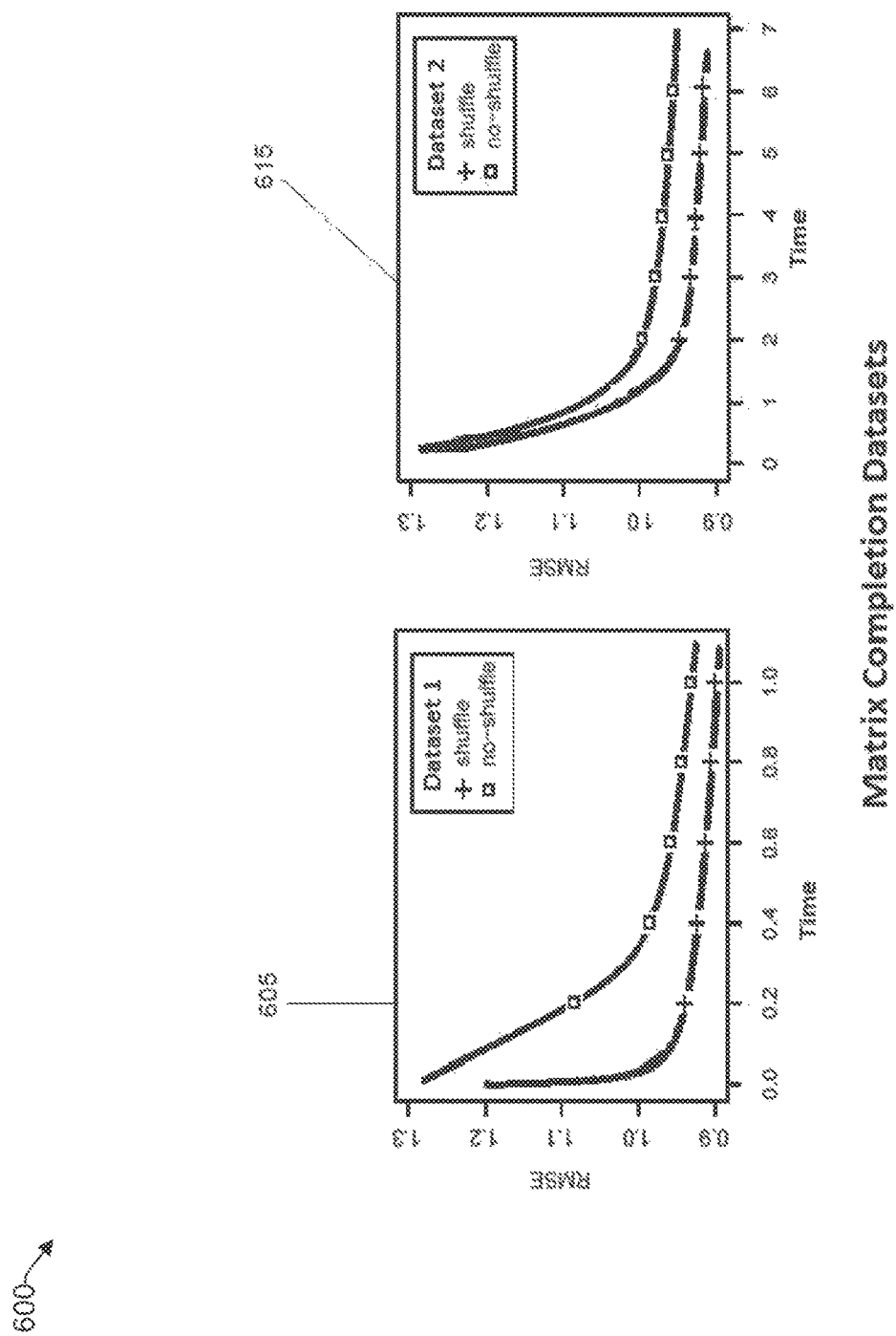
FIG. 6 are graphs illustrating why the shuffling scheme using the stochastic gradient descent method is preferable for big data, consistent with an illustrative embodiment.

FIG. 6 shows two recommender systems graphs consistent with an illustrative embodiment. It can be seen from the graphs 600 that the shuffling SGD method is preferable for big data, because of the errors. consistent with an illustrative embodiment. The recommender system graphs 605, 615 show the root mean square error (RMSE) versus time. In the first graph 605 the time is shown in two-tenth intervals of an hour. In the second graph 615 the time is shown in hour intervals. Both cases in these graphs demonstrate that the shuffling has a lower RMSE than the non-shuffling.

FIG. 7 illustrates some of the advantages 700 of the computer-implemented method of the present disclosure. As shown in FIG. 7, there is a faster convergence for machine learning models with an accuracy of >95%. At 705, there is noted that the samples are uniformly used to achieve a more accurate modeling. For the various datasets listed, it is shown the architecture (FFN feedforward neural network, CNN convolutional neural networks) and the training accuracy.

Figure 8:
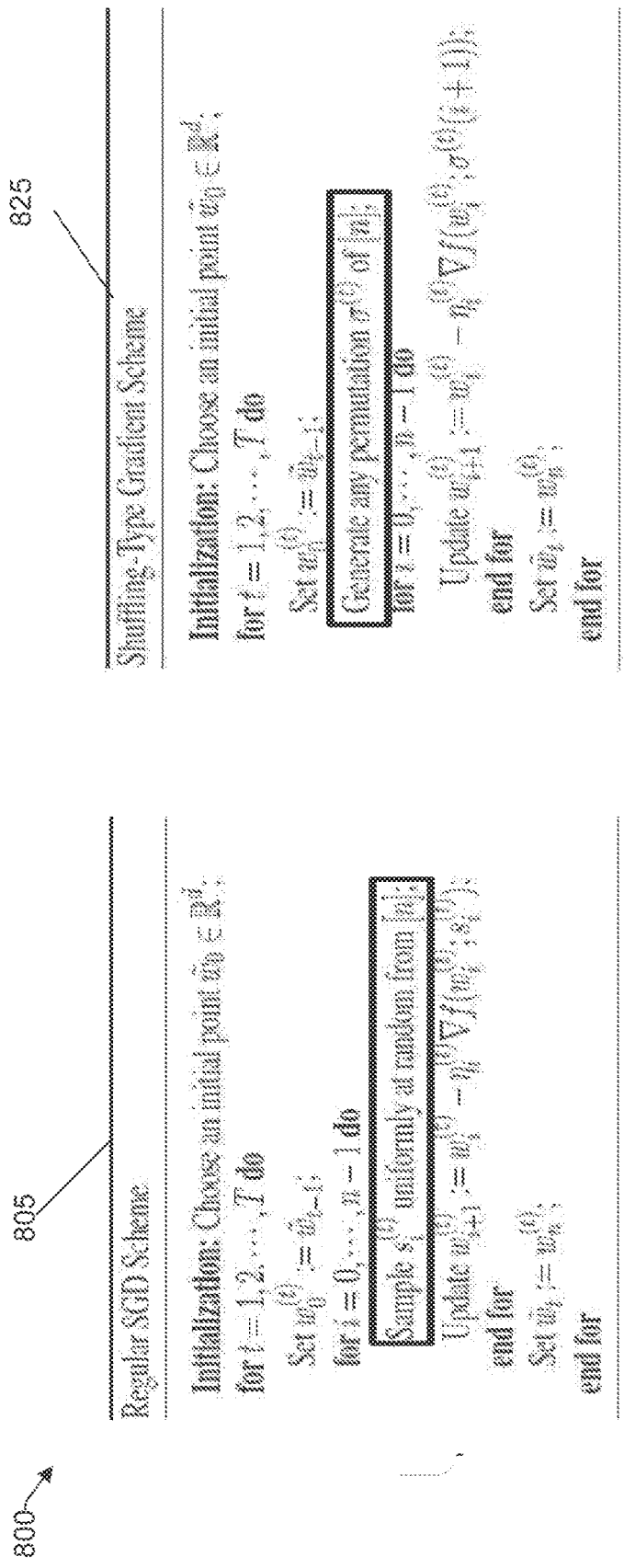
FIG. 8 illustrates a comparison of some functions of a regular scheme versus a shuffling scheme, consistent with an illustrative embodiment.

FIG. 8 illustrates a comparison of some functions of a regular scheme 805 versus a shuffling type scheme 825, consistent with an illustrative embodiment. Whereas in the regular scheme 805, there is a uniform sampling random chosen, in the shuffling scheme there is a generating of a permutation of n, an incremental gradient operation, shuffle once, and a reshuffling operations are performed. The advantages of shuffling include providing a scenario where there is virtually no chance for missing data. There is also no chance for using the sampling data unequally, since at each epoch, each sample is used once. Also, the shuffling advantageously provides the ability to escape stuck points regarding multiple local minima.

Example Process

With the foregoing overview of the example architecture, it may be helpful now to consider a high-level discussion of an example process. To that end, in conjunction with FIGS. 1-8, FIG. 9 depicts a flowchart 900 illustrating various aspects of a computer-implemented method, consistent with an illustrative embodiment. Process 900 is illustrated as a collection of blocks, in a logical order, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Figure 9:
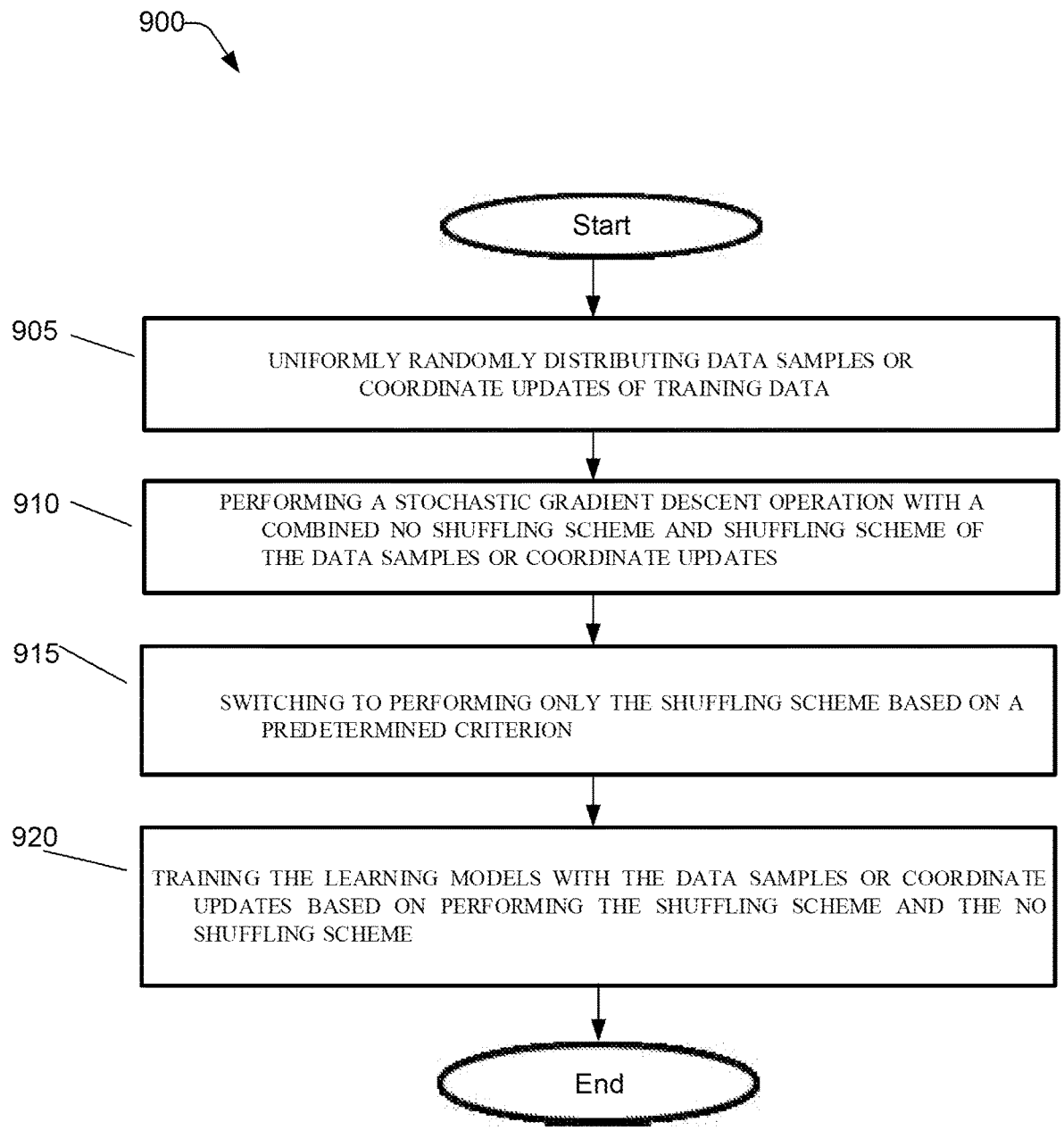
FIG. 9 is a flowchart illustrating an operation of training machine learning models with a shuffling-type gradient, consistent with an illustrated embodiment.

FIG. 9 is a flowchart 900 illustrating training machine learning models with a shuffling-type gradient, consistent with an illustrated embodiment.

Referring now to FIG. 9, at operation 905, there is an operation uniformly randomly distributing data samples or coordinating updates of a training data. The randomly distributed data samples help to ensure that the samples are not unequally considered.

At operation 910, a combined no-shuffling scheme is performed and shuffling scheme of the training data using a stochastic gradient descent (SGD) algorithm. This combination provides advantages of both schemes, including those of a regular (no-shuffling scheme) such as faster convergence when the current solution is far from the optimal solution, and those of shuffling, such as faster convergence when the current solution is close to the optimal solution.

At operation 915, there is a switching to perform a pure shuffling scheme from the combined no-shuffling scheme and shuffling scheme based on one or more predetermined criterion. The predetermined criterion can be the learning rate, or the error rate, or a combination of the two, or some other metric. The pure shuffling can provide for fewer errors in the training of the models, particularly with big data.

At 920, the machine learning model is trained with the training data based on performing the pure shuffling scheme, and the combined no-shuffling scheme and shuffling scheme.

Example Particularly Configured Computing Device

Figure 10:
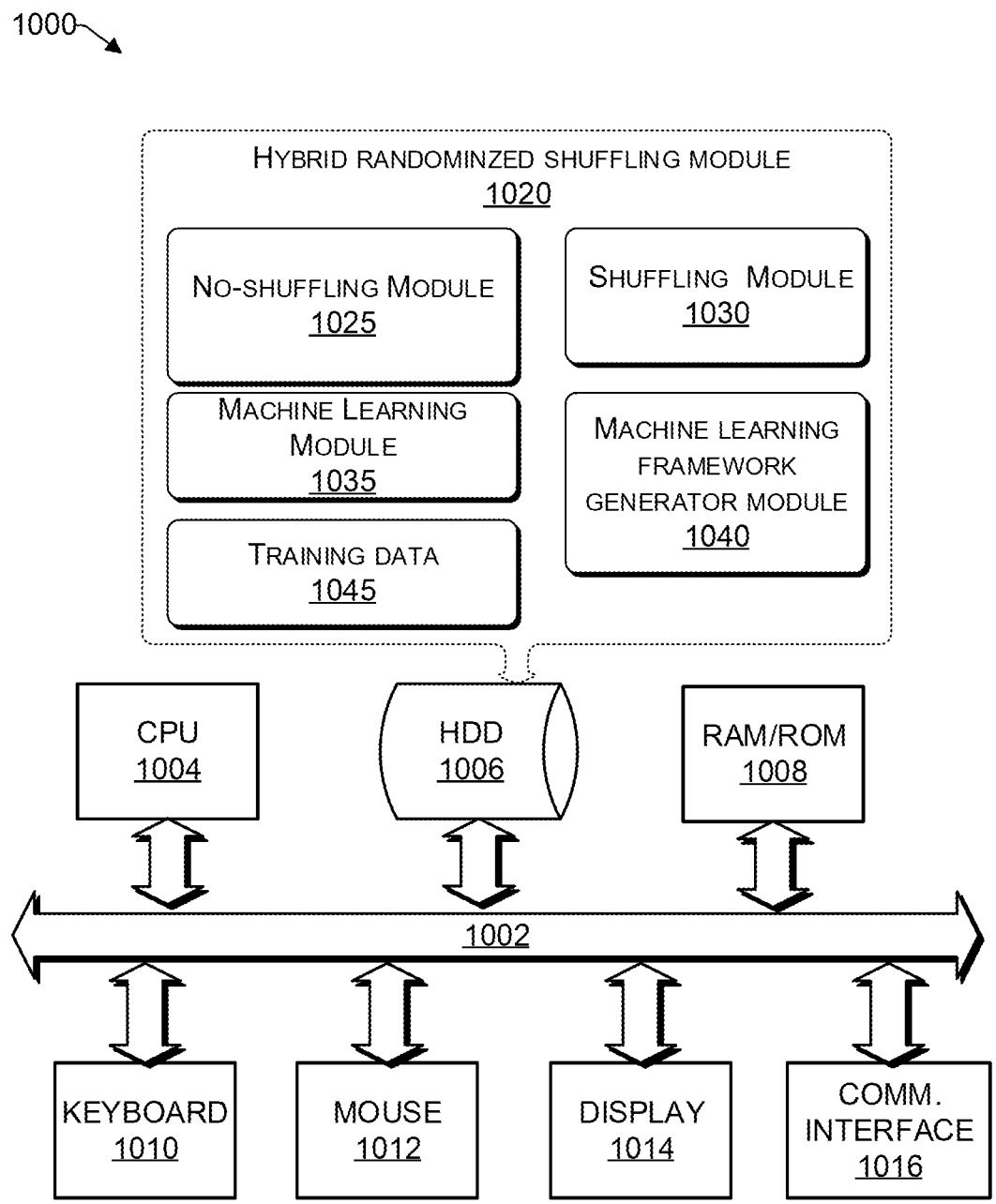
FIG. 10 is a functional block diagram illustration of a computer hardware platform that can communicate with agents in performing a collaborative task, consistent with an illustrative embodiment.

FIG. 10 provides a functional block diagram illustration 1000 of a computer hardware platform. In particular, FIG. 10 illustrates a particularly configured network or host computer platform 1000, as may be used to implement the method shown in FIG. 9. The computer platform 1000 may include a central processing unit (CPU) 1004, a hard disk drive (HDD) 1006, random access memory (RAM) and/or read-only memory (ROM) 1008, a keyboard 1010, a mouse 1012, a display 1014, and a communication interface 1016, which are connected to a system bus 1002. The HDD 1006 can include data stores.

In one embodiment, the HDD 1006 has capabilities that include storing a program that can execute various processes, such as the hybrid randomized shuffling module 1020, as discussed in a manner described herein above, and is configured to manage the overall process.

The no-shuffling module 1025 is configured to perform the gradient descent operations with the non-shuffling operations.

The shuffling module 1030 is configured to perform just shuffling, and this shuffling module 1030 is switched over from the no-shuffling module 1025 when one or more predetermined criterion are met. A threshold learning rate, or a threshold error rate can trigger the switching to operation of the pure shuffling module 1030.

The machine learning module 1035 is configured to train the machine learning models that are used in the training of, for example, a deep neural network (DNN).

The machine learning framework generator module 1040 is configured to generate a framework by which an optimization process to determine a highest convergence rate may occur. The machine learning framework generator module 1040 may be preloaded with user selected data, or alternatively may prompt for such data.

The training data module 1045 includes the data samples of big data that are used for training the machine learning models.

Example Cloud Platform

As discussed above, functions relating to environmental and ecological optimization methods may include a cloud. It is to be understood that although this disclosure includes a detailed description of cloud computing as discussed herein below, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 11:
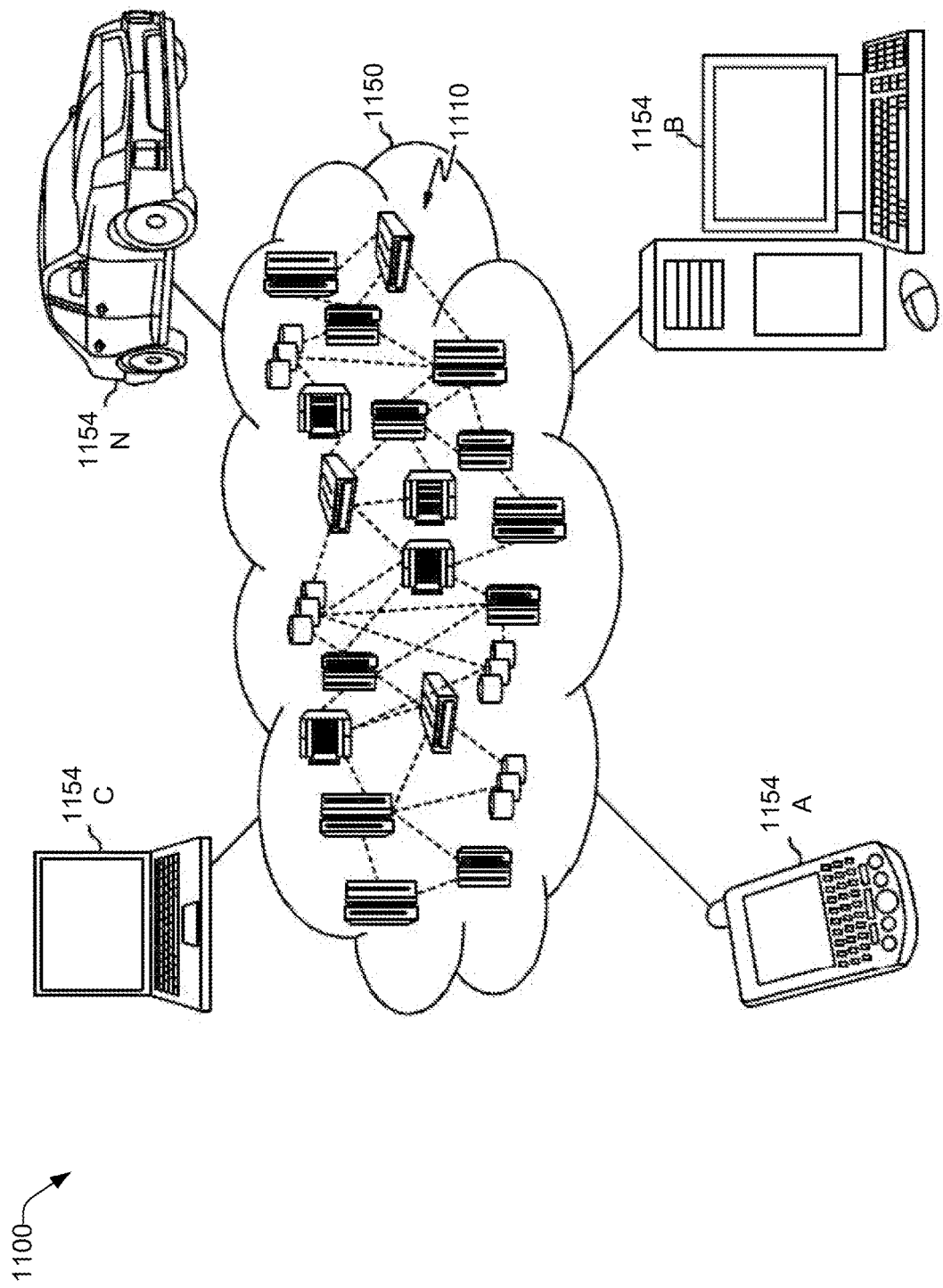
FIG. 11 depicts an illustrative cloud computing environment, consistent with an illustrative embodiment.

Referring now to FIG. 11, an illustrative cloud computing environment 1100 utilizing cloud computing is depicted. As shown, cloud computing environment 1100 includes cloud 1150 having one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1100 to offer infrastructure, platforms, and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
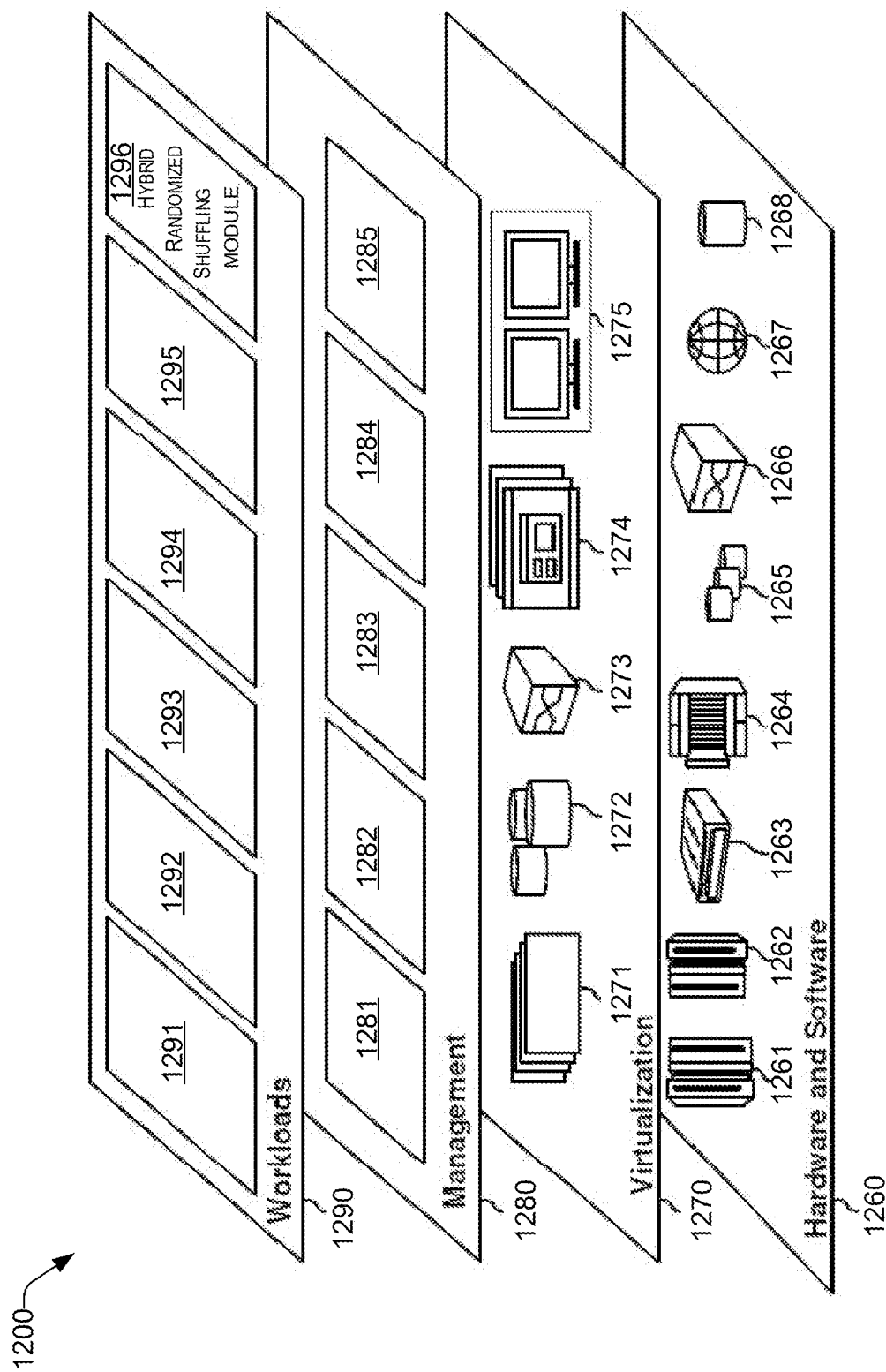
FIG. 12 depicts a set of functional abstraction layers provided by a cloud computing environment, consistent with an illustrative embodiment.

Referring now to FIG. 12, a set of functional abstraction layers 1300 provided by cloud computing environment 1100 (FIG. 11) is shown. It should be understood in advance that the components, layers, and functions shown in FIG. 12 are intended to be illustrative only and embodiments of the disclosure are not limited thereto. As depicted, the following layers and corresponding functions are provided:

Hardware and software layer 1260 include hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and a hybrid randomized shuffling module 1296 configured to train learning models by uniformly randomly distributing data samples utilizing a combined no-shuffling and shuffling scheme, and a pure shuffling scheme, as discussed herein.

CONCLUSION

In the present disclosure, there is developed a new and unified convergence analysis framework for shuffling-type gradient methods to solve (P) and apply it to different shuffling variants in both non-convex and strongly-convex settings. Some of the contributions can be summarized as follows:

(a) Proving $O(1/T^{2/3})$-convergence rate in epoch for constant step-sizes and $\~O(1/T^{2/3})$ convergence rate for diminishing step-sizes for a general shuffling-type gradient method to solve the non-convex problem (P), where $T:=K=n$ is number of epochs. The rate is significantly improved over $O(1=T1=2)$ rate of an incremental gradient method. These rates are the first improved non-asymptotic rates for SGD with shuffling for both constant and diminishing learning rates under standard assumptions.

(b) Establishing asymptotic convergence to a stationary point under a diminishing learning rate scheme. We achieve the best performance among different variants with the learning rate_$t=O(1/t^{\{1/3\}})$ in both theory and practice, where "t" is the epoch counter. Our learning rate is close to a "scheduled" one, i.e., it is constant at each epoch t and decreases with respect to "t" . . . .

(c) It can be shown that $O(1/T^2)$-convergence rate in epoch of our general shuffling-type gradient scheme for the strongly-convex case is acquired without imposing "gradient boundedness" and/or Lipschitz Hessian assumptions. In addition, our analysis does not require convexity of each component function as in some existing works. Our rate also can be viewed as $O(1/t^2)$ for any $1<=t<=T$ without fixing T a prior as in other works.

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain a nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for training of machine learning models with a shuffling-type gradient operation, the computer-implemented method comprising:
   uniformly randomly distributing data samples or coordinate updates of a training data;
   calculating the learning rates for a no-shuffling scheme and a shuffling scheme;
   performing a combined operation of the no-shuffling scheme and the shuffling scheme of the training data using a stochastic gradient descent (SGD) algorithm;
   switching to performing only the shuffling scheme from the no-shuffling scheme based on one or more predetermined criterion; and
   training the machine learning models with the training data based on the combined no-shuffling scheme and shuffling scheme.

2. The computer-implemented method of claim 1, wherein the data samples or coordinate updates of the training data comprise big data.

3. The computer-implemented method of claim 2, wherein the SGD algorithm used for performing the combined operation of the no-shuffling scheme and the shuffling scheme comprises at least one of Adagrad, Adam, RMSProp, or SGD Momentum algorithms as the no-shuffling scheme.

4. The computer-implemented method of claim 2, wherein:
the one or more predetermined criterion comprise a machine learning rate; and
the switching to performing only the shuffling scheme occurs according to the learning rate.

5. The computer-implemented method of claim 2, wherein:
the one or more predetermined criterion comprise a learning rate; and
the switching to performing only the shuffling scheme occurs according to the learning rate.

6. The computer-implemented method of claim 2, wherein the predetermined criterion comprises learning rate rules, and the method further comprises providing one or more learning rate rules that determine one or more of a predetermined theoretical complexity and a practical performance of the SGD algorithm.

7. The computer-implemented method of claim 6, wherein the learning rate rules include:
diminishing a learning rate scheme and obtaining a highest convergence rate result in a non-convex supervised learning model.

8. The computer-implemented method of claim 2, wherein the machine learning models are trained for a deep neural network (DNN) application.

9. The computer-implemented method of claim 2, wherein the machine learning models are trained for one or more of supervised learning operations.

10. A computing device including a configurable machine learning framework for training of machine learning models with a shuffling-type gradient operation of big data, the machine learning framework comprising:
a processor;
a memory coupled to the processor, the memory storing instructions to cause the processor to perform acts comprising:
generate a machine learning framework including a combined operation of a no-shuffling scheme and a shuffling scheme using a gradient descent (SGD) algorithm, the machine learning framework further configured for receiving a predetermined criterion for switching to performing only the shuffling scheme from the no-shuffling scheme, and training the machine learning models based on the combined operation of the no-shuffling scheme and the shuffling scheme.

11. The computing device of claim 10, further comprising receiving a user-selection of the predetermined criterion for switching to performing only the shuffling scheme from the no-shuffling scheme.

12. The computing device of claim 10, further comprising configuring the machine learning framework to perform the combined operation of the shuffling scheme and the no-shuffling scheme from one or more SGD algorithms comprising Adagrad, Adam, RMSProp, or SGD Momentum as the no-shuffling scheme.

13. The computing device of claim 10, wherein the predetermined criterion for switching to performing only the shuffling scheme from the no-shuffling scheme comprises a learning rate.

14. The computing device of claim 10, wherein the predetermined criterion for switching to performing only the shuffling scheme from the no-shuffling scheme comprises a learning rate.

15. The computing device of claim 10, wherein the machine learning framework is configured to prompt for at least one of an error rate or a learning rate as the predetermined criterion for switching to performing only the shuffling scheme from the no-shuffling scheme.

16. A computing device configured for performing a shuffling-type gradient for training machine learning models with big data using a stochastic gradient descent (SGD), the computer-implemented method comprising:
a processor;
a memory coupled to the processor, the memory storing instructions to cause the processor to perform acts comprising:
uniformly randomly distributing data samples or coordinate updates;
calculating the learning rates for a no-shuffling scheme and a shuffling scheme;
performing a combined operation of the no-shuffling scheme and the shuffling scheme of the data samples or coordinate updates;
switching to performing only the shuffling scheme from the no-shuffling scheme based on a predetermined criterion; and
training the learning models with the data samples or coordinate updates based on performing the combined no-shuffling scheme and the shuffling scheme.

17. The computing device of claim 16, wherein switching to performing only the shuffling scheme occurs according to a learning rate of the machine learning algorithm.

18. The computing device of claim 16, wherein switching to performing only the shuffling scheme occurs according to an error learning rate of the machine learning.

19. A computer-implemented method of determining a shuffling-type gradient method for training a machine learning model with big data using a stochastic gradient descent (SGD) method, the method comprising:
uniformly randomly distributing data samples or coordinate updates of a training data;
calculating learning rates for a no-shuffling scheme and a shuffling scheme;
combining a no-shuffling scheme and a shuffling scheme into a framework, and
operating a diminishing learning rate scheme and obtaining a highest known convergence rate result for randomly distributed samples in a non-convex supervised learning model.

20. The computer-implemented method of claim 19, wherein the machine learning models are trained for a deep neural network (DNN) application.

21. The computer-implemented method of claim 19, wherein the machine learning models are trained for supervised learning operations.

22. A non-transitory computer-readable storage medium tangibly embodying a computer-readable program code having computer-readable instructions that, when executed, causes a computer device to perform a shuffling-type gradient method for training a machine learning model with big data using a stochastic gradient descent (SGD), the shuffling-type gradient method comprising:
uniformly randomly distributing data samples or coordinate updates:
calculating learning rates for a no-shuffling scheme and a shuffling scheme;
performing a combined operation of the no-shuffling scheme and the shuffling scheme of the data samples or coordinate updates;

switching to performing operation of only the shuffling scheme from the no-shuffling scheme based on one or more predetermined criterion; and training the learning models with the data samples or coordinate updates based on performing the combined no-shuffling scheme and the shuffling scheme.

23. The non-transitory computer-readable storage medium of claim 22, wherein the predetermined criterion comprises learning rate rules, and the shuffling-type gradient method further comprises providing one or more learning rate rules that determine one or more of a predetermined theoretical complexity and a practical performance of the SGD algorithm.

24. The non-transitory computer-readable storage medium method of claim 23, wherein providing the learning rate rules includes operating a diminishing learning rate scheme and obtaining a highest convergence rate result in a non-convex supervised learning model.

25. The non-transitory computer-readable storage medium according to claim 22, wherein the machine learning models are trained for one or more of supervised learning operations.

\* \* \* \* \*